United States Patent [19]

Hazelton et al.

[11] 4,329,564
[45] May 11, 1982

[54] LASER UNDERCUTTING METHOD

[75] Inventors: Robert C. Hazelton, Christiansburg; J. Ray Hoyt, Radford, both of Va.

[73] Assignee: Kollmorgen Technologies Corp., Dallas, Tex.

[21] Appl. No.: 198,925

[22] Filed: Oct. 28, 1980

[51] Int. Cl.³ .............................................. B23K 27/00
[52] U.S. Cl. ............................... 219/121 LJ; 29/597; 219/121 LN
[58] Field of Search .................. 219/121 LG, 121 LH, 219/121 LJ, 121 LN, 121 LS, 121 L, 121 LM, 121 EH, 121 EJ, 121 EK; 310/42, 228; 29/597

[56] References Cited

U.S. PATENT DOCUMENTS

| 984,655 | 2/1911 | Fischer | 29/597 |
|---|---|---|---|
| 2,522,865 | 9/1950 | Dinkler | 29/597 X |
| 3,205,387 | 9/1965 | Boyer | 29/597 X |
| 3,279,041 | 10/1966 | Boyer | 29/597 |

FOREIGN PATENT DOCUMENTS

| 2733082 | 2/1979 | Fed. Rep. of Germany | 29/597 |
|---|---|---|---|
| 708446 | 1/1980 | U.S.S.R. | 29/597 |

Primary Examiner—C. L. Albritton
Attorney, Agent, or Firm—Fidelman, Wolffe & Waldron

[57] ABSTRACT

Removing some of the insulating material between commutator bars of flat or cylindrical commutators, hereinafter referred to as "undercutting," by exposing the commutator surface to one or more energy beams of a frequency and an energy level and for a time which are sufficient for removing the dielectric material to the desired degree without or substantially without removal of commutator bar material. The energy beam or beams may be arranged under an angle with respect to the perpendicular direction so that a certain amount of dielectric material is also removed from a zone underneath the edges of the commutator bars. A preferred high energy source is the $CO_2$ laser. Preferably, the high energy beam is guided over the commutator surface to sequentially illuminate, e.g., by a scanning motion, at least all exposed dielectric surfaces.

8 Claims, 10 Drawing Figures

LASER UNDERCUTTING METHOD

BACKGROUND OF THE INVENTION

This invention relates to an improvement in the manufacture of commutators for dynamoelectric machines and in particular to the commutators for direct current motors and generators.

More specifically, this invention relates to the controlled removal of insulating material from between the conductor bars on a commutator through use of a high energy beam.

Commutators comprise an array of electrically and geometrically separated conductors, hereinafter also referred to as commutator bars, supported mechanically in a matrix of non-conducting material. The commutator bars are commonly made of copper; other metals have been suggested for special purposes. The non-conducting material may be any insulator, preferably one with high mechanical and dielectric strength and elevated melting points, such as bakelite, mica and certain epoxy resin compositions. The array of commutator bars may be arranged on the surface of a cylinder, a disc or a flat strip depending on the configuration of the electrical machine and the desired properties of commutation.

In a conventional D.C. permanent magnet motor, the commutator may take the form of a drum comprised of conductor bars aligned with the axis of the motor shaft and separated and supported by narrow, non-conducting spaces. Other commutators known as face commutators are comprised of commutator bar segments arranged in sequence on an insulating carrier disc with the interspace between the segments partially filled with the insulating material. For use with linear motors, the commutator may have the form of a flat strip comprising parallel, alternate conducting and non-conducting bars aligned at right angles to the direction of travel of the motor moving part.

For reliable and efficient commutation, the surface of each conductor bar is preferably smooth and regular so as to produce a minimum of brush friction and brush wear. For many applications it is desirable to avoid any contact between the brush material and the non-conducting material of the matrix supporting the conductor bars thus avoiding extensive abrasion as well as brush contamination. Furthermore, abraded material tends to accumulate between brush and commutator resulting in degradation of commutation with increased sparking, wear and power dissipation.

It is known to avoid contact between brush surface and the material of the non-conducting matrix by the so-called "undercutting process" which selectively removes some of the insulating material at the surface between conductor bars, so that the surface of the non-conducting material is recessed between and with respect to the surface of the conductor bars. Using a brush with a surface in contact with the commutator which is substantially greater than the width of the non-conducting interspace between bars, any undesired contact between brush and non-conductive material may thus be avoided.

In one typical process for the manufacture of commutators the copper commutator bars are potted in a resinous material, e.g., an epoxy resin having satisfactory dielectrical and structural strength. The potted assemblies are then machined, e.g., turned and polished to remove excess of resinous material from the commutator bars and to provide a smooth clean commutating surface. This leaves the surface of the resinous material flush with the surface of the conductor bars. In order for removing said insulating material to a degree sufficient for impressing its surface below the surfaces of the conductor bars, a slicing saw or an end-mill or similar mechanical instruments are employed as, e.g., described in U.S. Pat. No. 3,279,041. Sawing or milling away the excess insulating material requires close attention of a skilled machine operator and is a time-consuming, labor-intensive and difficult operation. In addition, the sawing and/or milling operation often produces burrs on the side edges of the conductor bars necessitating an additional step for their removal.

SUMMARY OF THE INVENTION

Practice of this invention involves impinging a high energy beam, suitably radiant energy in the infrared range such as that produced by a $CO_2$ laser, on a commutator surface which is in motion relative to the beam. The beam energy is reflected or otherwise dissipated by the metal conducting bars of the commutator, but is substantially absorbed by the insulating material between bars causing thermal decomposition and ablative removal of surface portions of the insulating material without harm to the metal conducting bars.

Hence, one primary object of this invention is to provide a more efficient, less time-consuming, highly accurate process for removing the desirable amount of insulating material between conductor bars in a substantially automatic manner independent of operator skill.

It is a further object of the present invention to automatically produce commutators with the insulating material between conductor bars being recessed.

Furthermore, it is an object of this invention to efficiently remove a desired amount of insulating material situated underneath the edges of the conductor bars.

The foregoing objects as well as additional objects which will be clear from the following description are achieved by the process of the invention now described.

DISCUSSION OF THE INVENTION

According to this invention, there is provided a method for removing insulating dielectric material situated between the conductor bars of an electric commutator assembly so that the surface of said dielectric material is depressed with respect to the surface of the conductor bars, thus forming a recess of predetermined depth between adjacent conductor bars, comprising sequentially exposing at least the surface of the dielectric material between conductor bars to one or more high energy beams of a frequency and energy level suitable, and for a time sufficient for removing said dielectric material to the desired degree without or substantially without impairing the surface of the commutator conductor bars or substantially removing conductor metal.

In the preferred embodiment of the invention, the high energy beam or beams impinge on the dielectric material and at least part of the conductor bars adjacent to each interspace between two conductor bars filled with said dielectric material, with the conductor bar material partly or substantially completely reflecting the high energy beam, thus acting as an aperture for the ablation or disintegration of the said dielectric material.

In another embodiment of the invention, the high energy beam or beams impinge on the commutator surface at an angle with respect to the perpendicular direction of said surface, so that a certain amount of dielectric material is also removed from a zone underneath the edges of the respective commutator bars. In the case of two simultaneously operating high energy beams it has been found advantageous to arrange said beams in such way that they impinge on the surface under opposed angles.

The preferred high energy beam or beams are $CO_2$ laser beams.

The high energy beam or beams and the commutator surface are moved with respect to each other to sequentially illuminate at least all exposed surfaces of dielectric material arranged between adjacent conductor bars, e.g., by guiding the beam or beams over the commutator surface in a scanning mode.

Preferably, the high energy beam or beams is or are focused beams with the focal point being arranged above the surface of the commutator bars. Suitable distances between commutator surface and focal point have been found to be within the range of about 5 mm and 8 mm.

The method of this invention allows an efficient and reproducable removal of dielectric material to a desired depth of, e.g., 1 to 10 mm with respect to the surface of the commutator conductor bars.

The structure of the commutator surface, comprised of electrical conductor bars with the space between the conductor bars filled with a dielectric insulator material, e.g., bakelite, epoxy or other resin compositions, mica and the like, is characterized by the surface having alternating areas of good and poor heat conductivity and of high reflectance and high absorbence of the energy of high energy beams of selected frequency or frequency ranges. More specifically, the metallic commutator bars are good heat conductors and display high reflectance, while the dielectric material is a relatively poor heat conductor substantially absorbing the beam energy. Accordingly, radiant energy focused to a spot on or preferably just above the surface of a commutator bar is, to a very high degree, reflected with heat generated conducted away rapidly from the respective spot. The same high energy beam impinging on the dielectric material, however, is nearly completely absorbed and thus causes substantial localized heating producing disintegration or ablation and, in consequence, removal of dielectric material.

The beam emitted by a laser is coherent and characterized by a specific wave length depending upon the lasing medium; it is, therefore, especially suitable for the process of this invention. For the materials generally used in the construction of commutators, $CO_2$ lasers have been found to be well-suited. Laser beams transmitting energy at the right frequency, as exemplified by $CO_2$ laser, at a level destructive of the dielectric material and non-destructive of the commutator conductor material, may be focused on the interface between commutator bar and insulator material with the spot impinging on both types of materials simultaneously or sequentially. Such beam will destroy dielectric material as a function of energy level and time of exposure without damaging the commutator bars thus producing the desired undercutting. The laser system for removing excess dielectric material need not be a precision instrument, because disparity between reflectance and absorbence of the two materials employed for conductor bars and the dielectric causes the conductor bars to act as limiting apertures for the impinging beam or beams, and, therefore, corrects for equipment tolerances, etc.

Notably, the practice of this invention results in substantial cost savings and the manufacture of strip, face and cylindrical commutators of high quality.

DETAILED DESCRIPTION OF THE INVENTION

Figure 1:
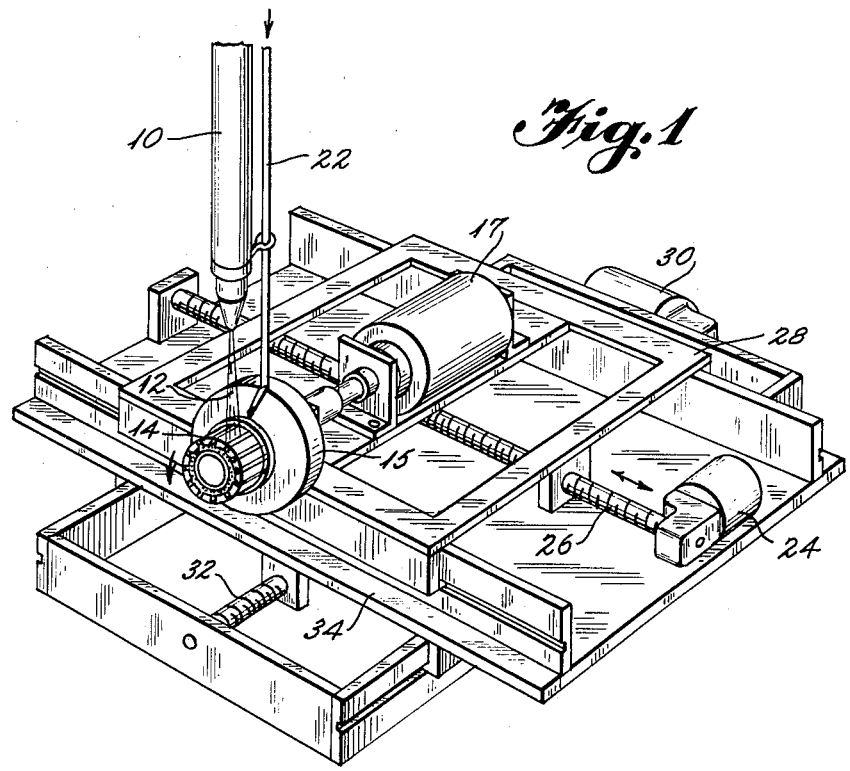
FIG. 1 is a perspective view of an apparatus for carrying out the process of this invention.
Figure 2:
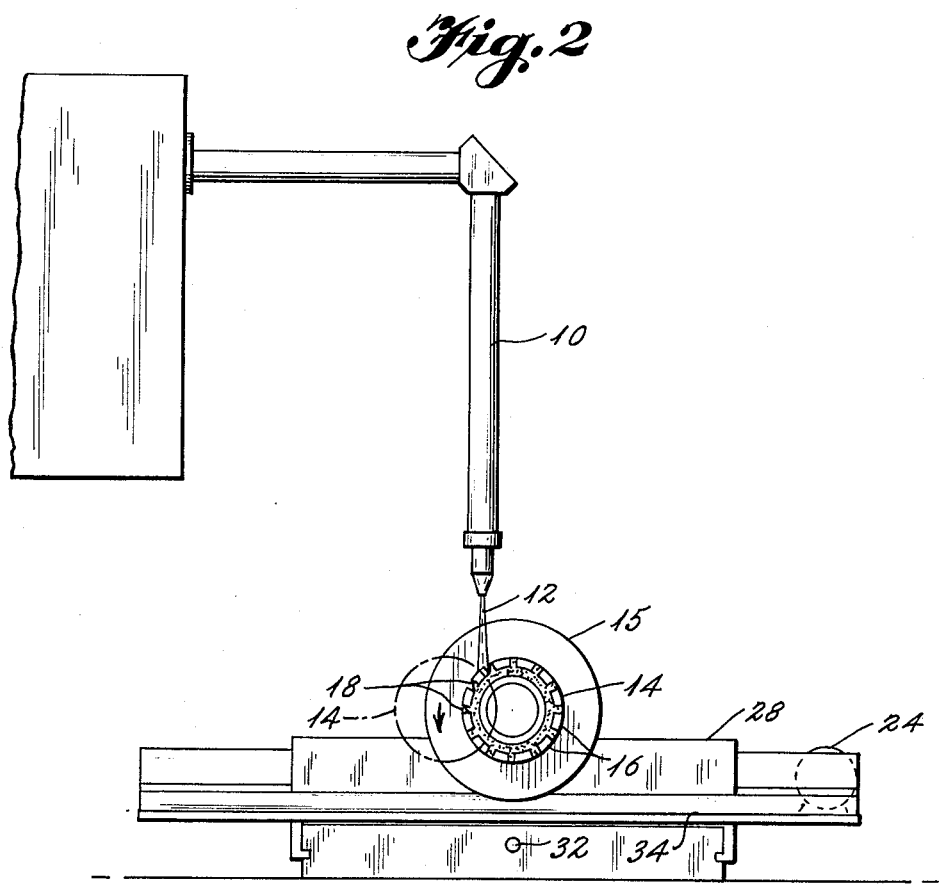
FIG. 2 is a front view of the apparatus of FIG. 1.

Referring first to FIGS. 1 and 2, there is illustrated schematically the equipment employed in the practice of this invention. It may be seen that a laser emitter 10, preferably a $CO_2$ laser, directs focused laser beam 12 at a spot on the surface of commutator 14. Beam 12 is incident upon the commutator surface at a non-normal angle, an angle illustrated in the drawing, see FIG. 2, as being 36°. Commutator 14 is mounted on arbor 15 and is rotatably driven by motor 17 in the direction illustrated by the arrow at a speed of, for example, 1500 rpm. Laser beam 12 impinges in alteration on one of the multiplicity of spaced apart copper commutator bars 16, then on one of the dielectric epoxy resin insulators 18, between the bars. The laser beam energy impinging on a bar 16 is in part reflected and in part absorbed, then spread through heat conduction. On the other hand, the spot on the dielectric insulator 18 impinged on by beam 12 erodes small quantities of dielectric from the surface due to the combination of its poor thermal conductivity and high proportion of beam energy absorbed in the surface layers of the insulator 18.

An air blast from line 22 directed against the laser beam impact spot removes whatever particles and vapors that are the destruction products evolving off the surface layers of the dielectric insulator 18, then cools the area. The cooling effect of the air blast assists in dissipation of heat from the commutator bar. The motor and arbor with mounted commutator are preferably supported upon an x-y table. Movement in the x direction is accomplished by activation of drive means 24 turning threaded shaft 26 which coacts with upper frame 28 to suitably position the commutator with respect to the laser beam. Similarly, movement in the y direction is accomplished through drive means 30 turning shaft 32 to coact with lower frame means 34.

During that time in which laser 10 is in operation with beam 12 impinging upon the commutator, the x-y table is caused to continuously cycle in a traverse back and forth in a y direction the axial length of commutator 14 causing the focused laser beam to strike at every point on the commutator surface. Laser 10 is preferably mounted on a z axis drive (not shown) for control of laser focal spot height.

In a preferred embodiment, all apparatus functions are controlled by a microprocessor controller. Controlled functions include x-y-z axis positions and feed rates; arbor speed and direction; laser shutter; and the number of passes, or y traverses, required to accomplish the desired degree or depth of undercutting. The control sequence can be entered manually or stored in a suitable memory which can be recalled by a simple address. Each address typically defines parameters required for the undercutting of a particular commutator. Two lasers rather than the one illustrated may be used in the apparatus, one disposed on each side of the commutator axis at a non-normal angle thereto. The two lasers may be employed simultaneously or sequentially.

It is preferred that the entire apparatus be enclosed in a ventilated housing or shroud (not shown). The dielectric insulator as it is eroded by beam 12 is in part thermally decomposed and in part ablated to produce smoke and particulates. An induced draft fan porting into the shroud may be used to draw air and decomposition products from the work area.

FIGS. 3-8 illustrate the action of the laser beam 10 on commutator 14. As the commutator rotates counterclockwise, the impact point of laser beam 10 moves off commutator bar 16 onto the dielectric of insulator bar 18 (see FIG. 4). Then as the commutator continues to travel, the laser beam 10 cuts away a pie-shaped segment 39 of dielectric, illustrated in FIG. 5, the opposing pie-shaped segment being in the shadow of the leading commutator bar 16. The cutting action may be carried out through a single pass or by multiple passes into the laser beam, preferably multiple passes. The rate of travel in the y direction of the x-y table is selected to provide a relatively slow traverse whereby the laser beam path on each revolution of commutator 14 greatly overlaps the path on the previous revolution.

Figure 3:
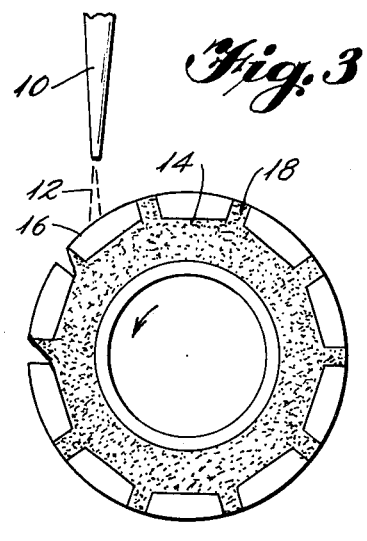
FIGS. 3 to 8 inclusive illustrate successive steps in the removal of insulation from between adjacent commutator bars using a laser to produce a high energy beam.
Figure 4:
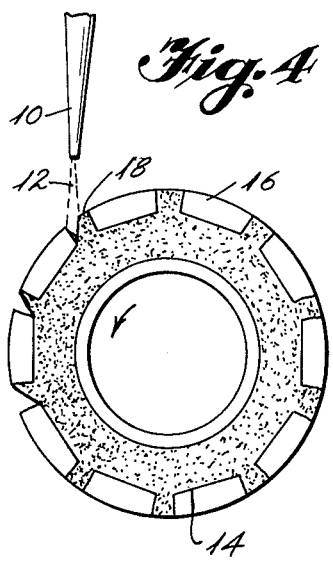
Figure 5:
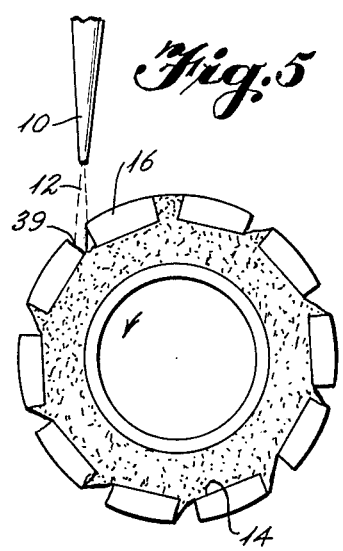
Figure 6:
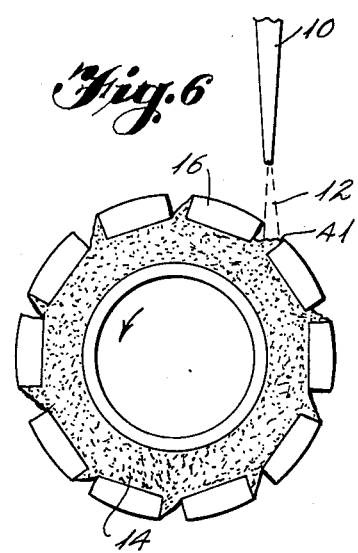
Figure 7:
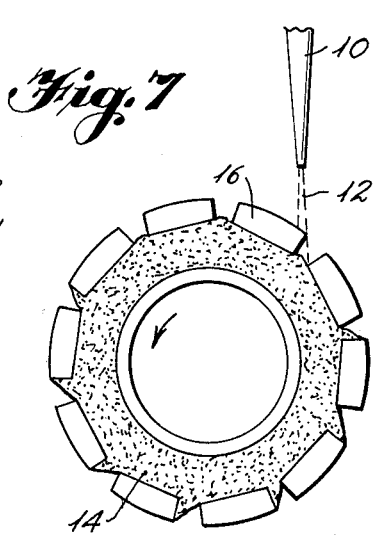
Figure 8:
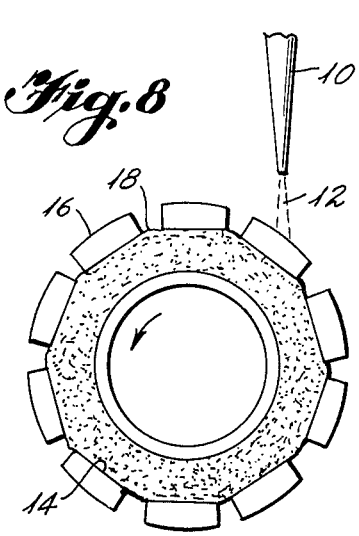

Those segments of the dielectric shadowed by the leading edges of commutator bars 16 are removed by positioning the laser on the opposite axial side of commutator 14, as is illustrated in FIGS. 6-8, and thereafter repeating the procedure described in the discussion of FIGS. 3-5. When laser beam 10 is in position, the beam cuts away pie-shaped segment 41, as is shown in FIGS. 6 and 7. The shadow region of the trailing commutator bar then shields insulator 18 from being cut away beyond pie-shaped segment 41 as is best shown in FIG. 7. FIG. 8 illustrates the final result of an insulator section 18 depressed below the top surface of the adjacent commutator bars 16.

The non-normal angle at which laser beam 12 is incident on commutator 14 in its cutting position on either side of the commutator axis allows the beam to clearly remove dielectric material from the side walls of the commutator bars 16. Shifting of the laser from the position to the left of the commutator axis, shown in FIGS. 3-6, to a position to the right of the commutator axis, shown in FIGS. 6-8, is accomplished by movement of the x-y table in the x direction. Preferably this shift is controlled by a programmed microprocessor as has been previously described. Of course the laser 10, rather than the table-mounted commutator could be shifted, but this is less preferred. Provision of two lasers, one on each side of the commutator axis, would avoid the necessity for making an x-axis translation and the removal of pie-shaped segments 39 and 41 could be accomplished simultaneously.

Figure 9:
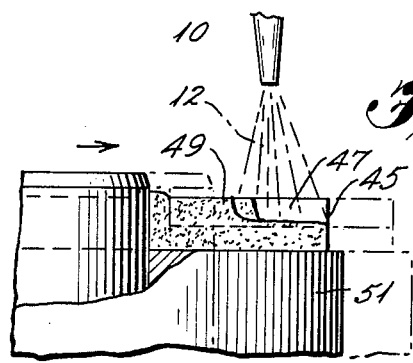
FIG. 9 is a partial sectional view showing use of the method with a flat-faced commutator.
Figure 10:
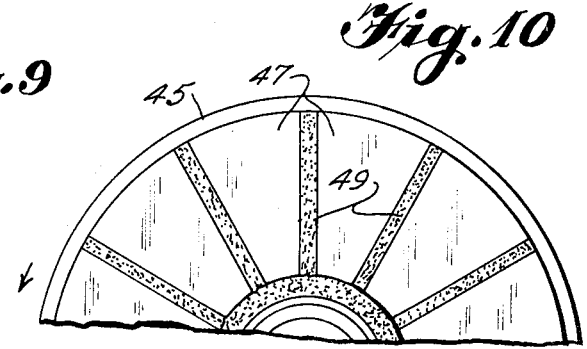
FIG. 10 is a plan view illustrating a portion of a face commutator acted upon in FIG. 9.

The invention is not limited to use with cylindrical commutators, but may be applied to the various types of flat-faced commutators as well. FIG. 9 illustrates use of the invention to undercut a flat-faced commutator while FIG. 10 depicts a plan view of a portion of the commutator acted upon in FIG. 9. Referring to these Figures, commutator 45 comprises a series of radially extending, evenly spaced commutator bars 47 separated by insulator sections 49. The commutator is mounted upon a vertically oriented arbor 51 supported on an x-y table. The arbor and commutator are rotatably driven by a motor or other suitable means (not shown). As in the case of a cylindrical commutator, the laser beam 12 should strike the commutator face at a non-normal angle in order to allow the beam to clearly remove dielectric material from the side walls of commutator 45. Laser 10 may be disposed at a non-vertical angle to accomplish this result.

As shown in FIG. 9, commutator 45 is rotated beneath the laser beam 12 resulting in removal of dielectric material 49 from between commutator bars 47. The commutator is traversed across the beam path in a radial direction by programmed movement of the x-y table. Segments of dielectric material are removed from the insulator bars between adjacent commutator bars in the fashion described in relation to use of the process with cylindrical commutators.

Practice of the present invention is exemplified by the following practical test to remove a potted epoxy insulator from between the copper pads in a series of commutators. The removal depth was to be between 0.0102" at a minimum to 0.0105" at a maximum. The commutators were mounted in turn on an arbor attached to a variable speed motor, much as is illustrated in FIG. 1.

A 1500 rpm motor speed was selected for the tests. In addition, the laser was mounted to traverse the commutator axially at a 0.1" per second traverse speed so as to remove the epoxy material without a large spiral projection between successive passes under the laser beam.

The laser was a $CO_2$ laser controlled to deliver 150 watts of energy (Model 525-2 Everlase) with a 2.5" focal length lens. The beam angle was (as illustrated in FIG. 1) at 36° and the commutator was rotated into the beam as is illustrated in FIG. 1. The laser focal point was 0.3" above the commutator surface level. For the second cut, the commutator was moved laterally to reposition the beam 36° to the right of the commutator axis.

With the equipment and the equipment setup as described above, nine commutators were completed with essentially uniform removal of dielectric material to a depth of 0.01 to 0.014 inches from between the commutator bars. The 1500 rpm motor speed and the 0.1" per second traverse allowed multiple passes through the beam. It was not considered advisable to remove the desired quantity of dielectric material in a single pass.

The invention in its broadest aspects is not limited to the specific steps, procedures and materials described. It is to be understood, therefore, that departures may be made from the specific embodiments while keeping within the scope of the accompanying claims and without departing from the principles of the invention or without sacrificing its chief advantages.

We claim:

1. A method for removing insulating dielectric material situated between the conductor bars of an electric commutator assembly so that the surface of said dielectric material is depressed with respect to the surface of the conductor bars, thus forming a recess between adjacent conductor bars of predetermined depth, comprising sequentially exposing the surface of the dielectric material between conductor bars to at least one high energy beam of a frequency and energy level suitable to and for a time sufficient to remove said dielectric material to a desired degree without substantially impairing the surface of the commutator conductor bars, the high energy beam impinging on the commutator surface at an angle with respect to the perpendicular direction on said surface so that in the main, the high energy beam impinges on the dielectric material and at least the part of the conductor bars adjacent to each interspace between two adjacent conductor bars filled with said dielectric material, whereby removal of dielectric material from adjacent the edges of the commutator bars is assured.

2. The method of claim 1 wherein two high energy beams impinge under opposed angles.

3. The method of claim 1 wherein the high energy beam is a $CO_2$ laser beam.

4. The method of claim 1 wherein the high energy beam and the commutator surface are moved with respect to each other to sequentially illuminate at least all exposed surfaces of dielectric material arranged between adjacent conductor bars.

5. The method of claim 4 wherein the high energy beam is guided over the commutator surface, in a scanning mode.

6. The method of claim 1 wherein the high energy beam is a focused beam with the focal point of said beam being arranged above the surface of the commutator conductor bars.

7. The method of claim 6 wherein the focal point is between about 5 mm and 8 mm above said commutator surface.

8. The method of claim 1 wherein the dielectric material is removed to a depth of 1 to 10 mm with respect to the surface of the commutator conductor bars.

* * * * *